(No Model.) 3 Sheets—Sheet 1.
A. B. HENDRYX.
BIRD CAGE.
No. 277,724. Patented May 15, 1883.
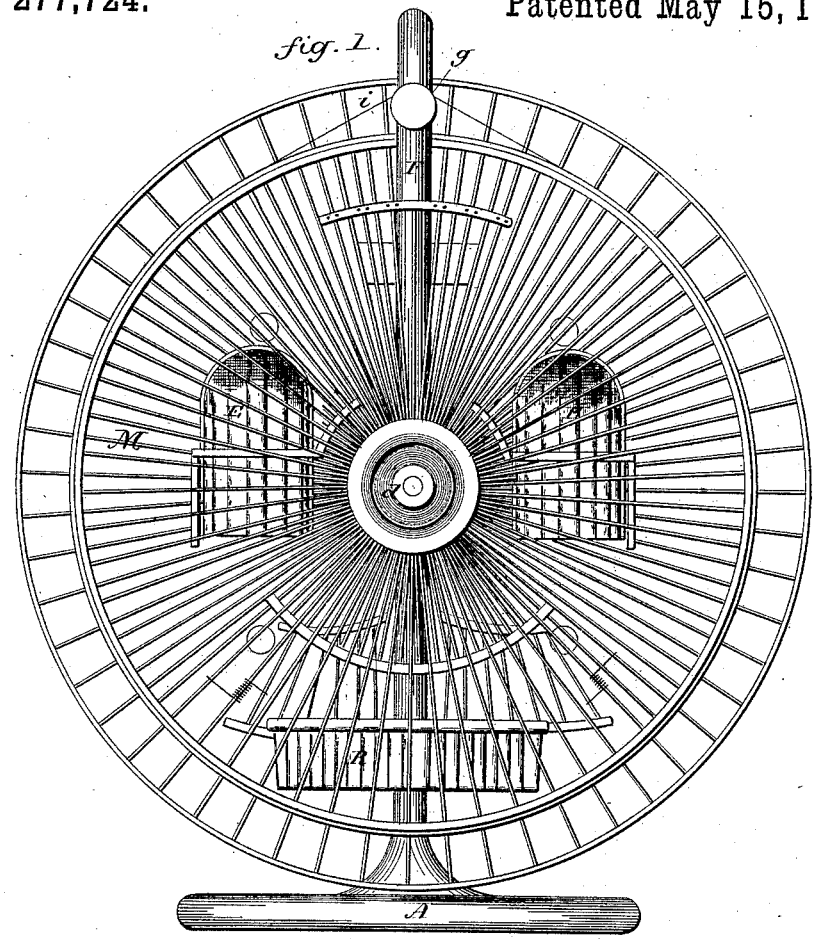
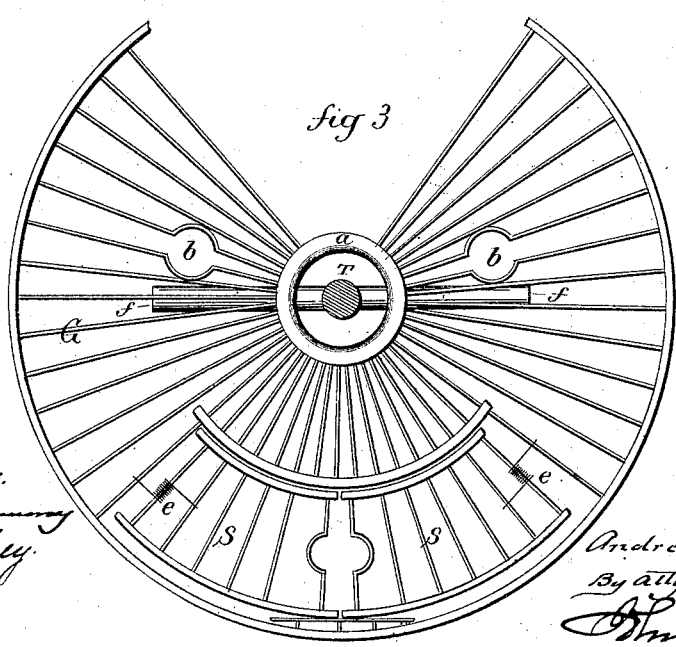

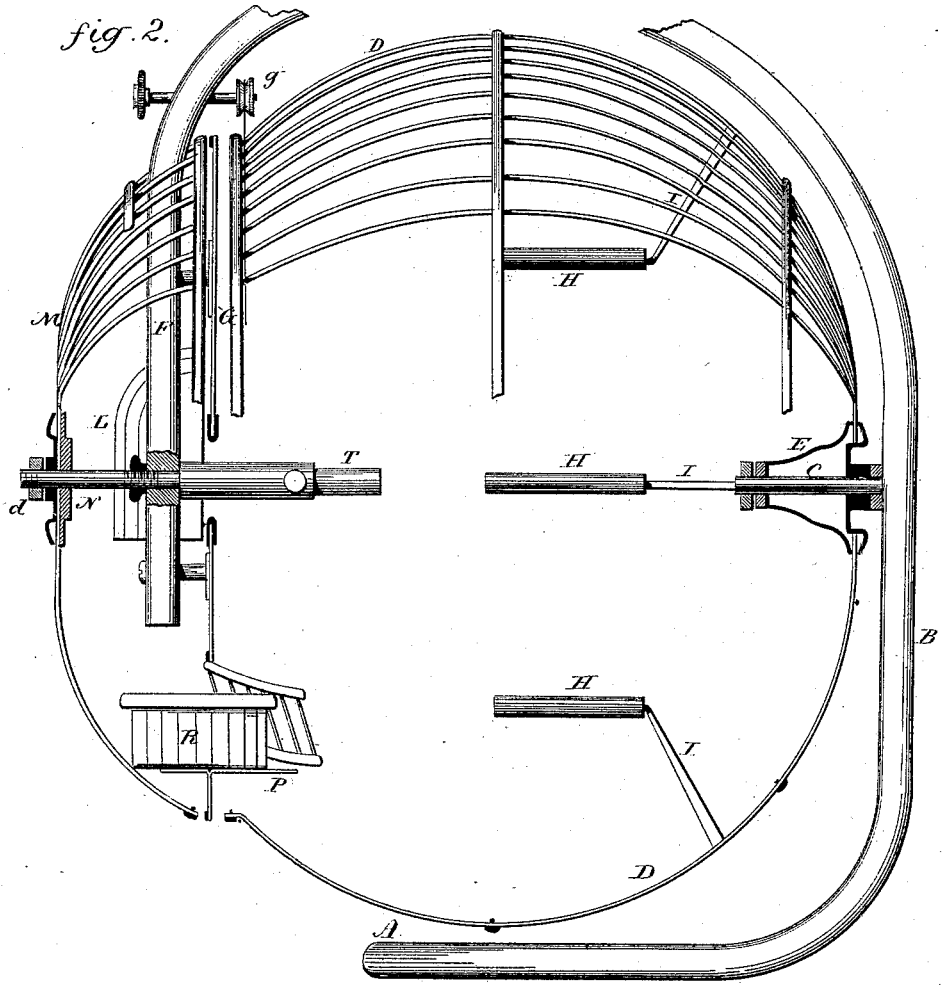

(No Model.) 3 Sheets—Sheet 3.
A. B. HENDRYX.
BIRD CAGE.
No. 277,724. Patented May 15, 1883.
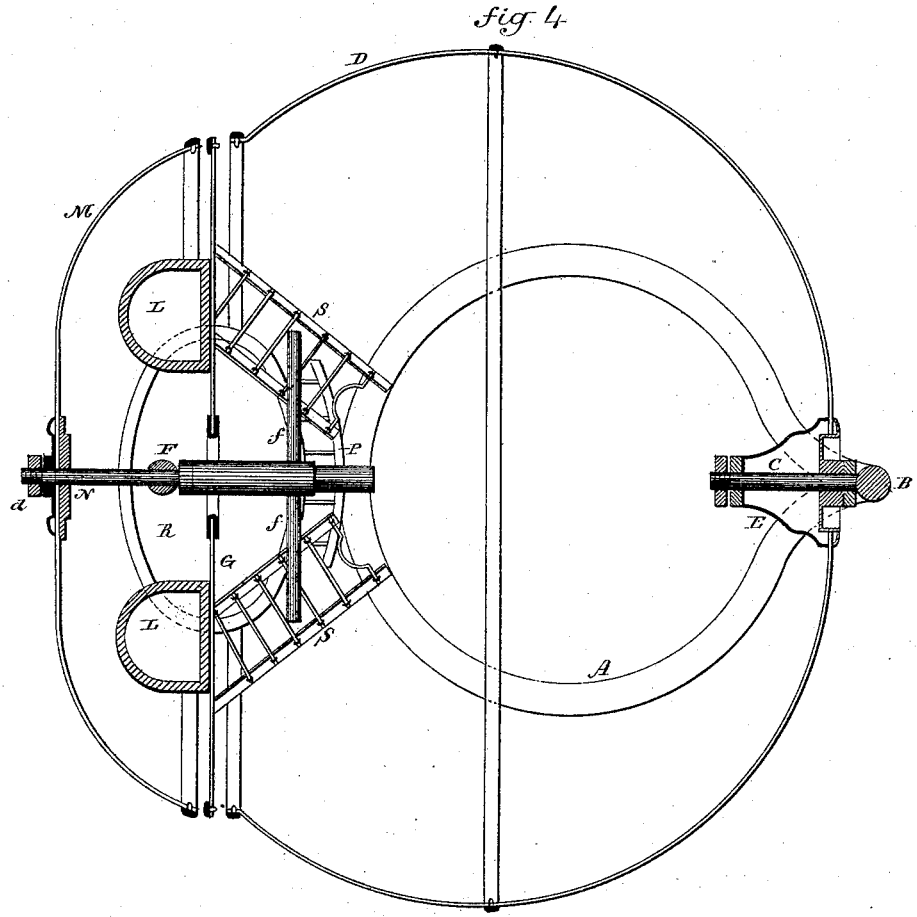
Witnesses
Jos. C. Earle
Lillian D. Kelsey
Inventor
Andrew B. Hendryx
By Atty
John C. Earle

UNITED STATES PATENT OFFICE.

ANDREW B. HENDRYX, OF NEW HAVEN, CONNECTICUT.

BIRD-CAGE.

SPECIFICATION forming part of Letters Patent No. 277,724, dated May 15, 1883.

Application filed January 29, 1883. (No model.)

*To all whom it may concern:*

Be it known that I, ANDREW B. HENDRYX, of New Haven, in the county of New Haven and State of Connecticut, have invented a new Improvement in Bird-Cages; and I do hereby declare the following, when taken in connection with the accompanying drawings and letters of reference marked thereon, to be a full, clear, and exact description of the same, and which said drawings constitute part of this specification, and represent, in—

Figure 1, a view from the feed end of the cage; Fig. 2, a sectional side view; Fig. 3, a sectional view taken just inside the stationary partition and looking toward said stationary partition; Fig. 4, a horizontal central section, looking downward, the wires below being omitted, as are the most of the wires beyond the parts illustrated in the other figures, for the reason that a complete filling in of the wires would confuse the drawings.

This invention relates to an improvement in bird-cages, the object of the invention being to make the cage—that is, the part of the cage within which the bird is confined—to revolve, in contradistinction to a revolving wheel which is attached to and forms one apartment of a bird-cage; and the invention consists in the construction as hereinafter described, and more particularly recited in the claims.

A represents the base, from which an upright support, B, extends. This upright support carries a stationary spindle, C, fixed to the upright and standing in a horizontal position. D is the cage proper, which is of substantially spherical form. At one pole it is fixed to a hub, E, arranged on the spindle C, and so that the cage will readily revolve on the said spindle. The end opposite the pole is open. The upright B extends over and down upon the opposite side of the cage to form an arm, F, to which a fixed side, G, is attached, which practically closes that side or end of the cage, the side G being in a plane at right angles to the axis of the cage. The revolving part D of the cage is made from wire in any of the usual constructions of making wire bird-cages, and is provided with several perches, H, more or less in number, each perch made fast to the revolving part of the cage by an arm, I, or otherwise, and distant from the cage, so as to leave a space upon which the bird may stand when the perch is upright, and so that the bird standing upon one of the perches above the lowest perch, its weight will cause the cage to revolve on its axis, and the bird jumping from one perch to another, as it soon will learn to do, will cause the wheel to make full and continued revolutions, substantially as in that class of cages in which a wheel is applied as an attachment to the cage. The fixed side G is made from wire, extending radially from a central ring, *a*, or otherwise. To the outside of the fixed side or wall of the cage the feed or water cups L are attached, as shown, there being an opening, *b*, provided through this fixed wall of the cage for the bird to reach the feed-cups.

Outside the fixed wall is a removable wire cap, M, which incloses this entire side, as shown, and is secured upon a spindle, N, which is made fast to the support F, the outer end of the spindle screw-threaded, and a nut, *d*, applied to bind the cap upon that end of the cage. This cap is made from wires, preferably radiating from a center, as shown, but may be otherwise shaped, and in general outline completes the spherical shape of the cage.

On the inside of the fixed wall and near the bottom a platform, P, is provided, standing in a horizontal plane and within the revolving cage. This platform has a floor, upon which the bird may stand if it so desire, and also has a rest for the bath-cup R, as seen in Fig. 2. To insert the cup, I construct the fixed wall G with an opening near the platform, and provide two doors, S S, by which it is closed, the doors held closed by a spring, *e*, or otherwise, but so that when the cap is removed the bath-cup may be readily placed through the opening in the partition onto the platform, as shown, the doors turning inward and to one side for this purpose.

The spindle N is extended inward to form a perch, T, and to this an arm, *f*, may extend to the right and left to form stationary perches for the bird.

As the support for the revolving cage is at one pole only, and which arrangement will be sufficient in the smaller classes of cages, in the heavier cages it may be desirable to place or provide some support at the opposite end. This is best done by means of a fixed pulley, *g*, over that side of the cage opposite the pole, and placing a suitable band, i, around the cage at that end and over the pulley, which band will form a support for that end of the cage, and run freely over the pulley g.

Instead of making the base A and upright B in one piece, and continuing that piece over the top of the cage and down upon the outside to form the support F for the stationary wall G; the base may have the upright B attached to it, to only extend up to receive the spindle C, and on the opposite side a corresponding pulley may be applied, it only being essential that there shall be a support from the base to carry the spindle to support the revolving cage at one of its poles, and a support at the other end to carry the fixed side or wall G, upon which the feed-cups, &c., may be arranged.

The cap M, while desirable for the neat and tasteful appearance of the cage, is not necessary thereto.

That end of the cage opposite the bearing upon which it revolves may be substantially closed, the stationary end being only sufficient to extend into the cage and form stationary perches and supports for the cup, as—for illustration, the perch T and transverse perches f may have the feed-cups attached directly thereto, and an opening through the cage at some point by which the cups may be reached—the essential feature of my invention being that the cage which contains the bird shall be hung upon an axis, and so as to revolve freely thereon, with one or more fixed perches within the said revolving part of the cage, and perches fixed to and revolving with the cage, in contradistinction to a cage which has a stationary apartment for the bird, and an apartment which revolves upon an axis.

I claim—

1. A bird-cage hung at one end upon a spindle, and so as to revolve on the said spindle as a horizontal axis, the other end of the cage open, combined with a fixed wall or side which closes that open end, the said stationary side provided with openings for the feed-cups, substantially as described.

2. A bird-cage hung at one end upon a spindle, and so as to revolve on the said spindle as a horizontal axis, the other end of the cage open, combined with a fixed wall or side which closes that open end, the said stationary side provided with openings for the feed-cups, and with a platform, P, extending into the cage, with an opening through the partition to said platform, substantially as described.

3. A bird-cage hung at one end upon a spindle, and so as to revolve on the said spindle as a horizontal axis, the other end of the cage open, combined with a fixed wall or side which closes that open end, the said stationary side provided with openings for the feed-cups, the said cage provided with perches H, fixed to and so as to revolve with the cage, substantially as described.

4. A bird-cage hung at one end upon a spindle, and so as to revolve on the said spindle as a horizontal axis, the other end of the cage open, combined with a fixed wall or side which closes that open end, the said stationary side provided with openings for the feed-cups, with a stationary pulley, g, over the cage and at the open end, and a band around the cage and over said pulley, substantially as described.

5. A bird-cage hung at one end upon a spindle, and so as to revolve on the said spindle as a horizontal axis, the other end of the cage open, combined with a fixed wall or side which closes that open end, the said stationary side provided with openings for the feed-cups, with the wire cap M over said fixed wall and inclosing the feed-cups, substantially as described.

6. A bird-cage hung at one end upon a spindle, and so as to revolve on the said spindle as a horizontal axis, the other end of the cage open, combined with a fixed wall or side which closes that open end, the said stationary side provided with openings for the feed-cups, and a stationary perch, T, substantially as described.

7. A bird-cage formed from wire, and of substantially spherical form, the wires at one pole extending from and fixed to a hub, E, said hub arranged upon a fixed horizontal spindle, C, extending from an upright, B, the opposite end of the cage open, combined with a stationary wall, G, at the said open end, and which practically closes that end, said partition provided with feed-openings, substantially as described.

8. A bird-cage formed from wire, and of substantially spherical form, the walls at one pole extending from and fixed to a hub, E, said hub arranged upon a fixed horizontal spindle, C, extending from an upright, B, the opposite end of the cage open, combined with a stationary wall, G, at the said open end, and which practically closes that end, said partition provided with feed-openings, and a cap, M, over said closed end, and substantially completing the spherical shape of the cage, substantially as described.

ANDREW B. HENDRYX.

Witnesses:
EDWARD N. PECK,
LE GRAND CANNON.